United States Patent Office 3,711,316
Patented Jan. 16, 1973

3,711,316
PROCESS FOR COLORING KERATINOUS FIBRES WITH PIGMENT
Ian Bruce Angliss, Belmont, Victoria, and Menzie Lipson, Highton, Victoria, Australia, assignors to Commonwealth Scientific and Industrial Research Organization, Campbell, Australian Capital Territory, Australia
No Drawing. Filed Feb. 16, 1971, Ser. No. 115,822
Int. Cl. D06m 3/02
U.S. Cl. 117—55                                9 Claims

ABSTRACT OF THE DISCLOSURE

Textile materials consisting wholly or partly of wool or other keratinous fibers are colored by coating the fibers with a dispersion of a finely divided solid pigment in an aqueous liquor containing up to 4% by weight of a mixture of a polyamide-epichlorhydrin resin and an etherified methylol melamine resin, drying the applied dispersion on the fibers, treating the thus coated fibers with an aqueous emulsion of a soft acrylic polymer containing from 0.5 to 7% of the polymer and drying and curing the applied coating.

---

This invention relates to processes for the dyeing of wool or other materials consisting wholly or partly of keratin fibres with pigment dyes.

Normal dyeing methods in which conventional types of dye applied to wool or other keratinous materials produce colored fibres which fade and change shade on exposure to sunlight and on washing, often to an extent which limits the use of the product. In addition, many conventional dyes are not bright and in particular bright pastel shades are difficult to produce.

In general, the conventional types of dyes used in dyeing wool and other keratinous materials are those which are soluble in the media in which they are applied. These conventional dyes are applied to the materials in such a manner as to penetrate into each individual fibre. As pointed out above, materials dyed with these dyes to produce bright pastel shades are not fast to sunlight. Fading occurs rapidly and most conventionally dyed bright pastel colors on wool when rated according to the I.S.O. Tentative Test method described in Standard Methods for Determination of Colour Fastness in Textiles, 3rd edition, Bradford S.D.C. p. 53 (1962) receive ratings from 1 to, at the best, 5. Furthermore, wool and other keratinous materials have an inherent property of yellowing on exposure to sunlight, so that conventionally dyed pastel shades invariably fade due to a combination of the susceptibility of the dyestuff itself to sunlight and the yellowing of the wool or other keratinous material.

A principal object of this invention is to provide a technique enabling pigments to be applied to wool or other materials consisting wholly or partly of keratinous fibres.

In contrast to the conventional dyes, pigments are particulate in nature and are insoluble in the media which they are applied. In addition, in pigment dyeing wool and other keratinous materials, the pigment particles are fixed to the surface of the fibre and do not penetrate into the body of the fibre as do the dyes conventionally used. In this process of pigment dyeing, the entire surface of each individual fibre within the material is "painted" with a uniform layer of pigment particles so that the effect of any yellowing of the fibre is masked. Also, the majority of pigments have a much better fastness to sunlight than do the conventionally used dyes.

The process of pigment dyeing also contrasts with pigment-printing processes in which a highly viscous dispersion of the pigment is utilised to deposit a colored layer on the surface of the fabric. Such a printing process does not achieve uniform coverage of every fibre from one side of the material to the other as the print is only required on the face of the fabric and in general, only a small area of color is required.

The present invention provides a dyeing process by which very bright pastel shades can be produced that have remarkably high retention of shade on exposure to sunlight. Bright pastel colors produced using selected pigments according to the process of this invention, when rated by the I.S.O. Tentative Test method described above, are rated from 5 to 8. Furthermore, wool and other keratinous materials dyed with pigments by this process have been found to have good retention of shade when washed, exhibiting little or no staining on other fibrous materials washed with them. The present invention is not, however, restricted to the use of colored pigments, and includes processes by which white pigment may be applied to wool and other keratinous materials to obtain a bleached effect.

According to the present invention, there is provided a process for the pigment dyeing of wool or other materials consisting wholly or partly of keratin fibres which comprises the steps of treating the material with a polymer or mixture of polymers containing the pigment or pigments in finely dispersed form so as to coat the fibres, drying the pigment dispersion onto the fibres, treating the thus coated fibres with a further polymer to form a layer of this polymer over the pigmented layer and drying and curing the coated material.

The use of the process of the present invention enables an even distribution of pigment to be applied to the surface of every fibre throughout the material.

The process of this invention is not restricted to use with any particular pigments and is applicable to all pigments when ground to a suitable particle size and dispersed in the polymer or polymer mixture. The amount of pigment or pigments applied to the fibres will vary with the depth of shade and color required but, in general, will be up to about 10% by weight of the fibres. Thus up to 1 to 2% by weight of a bright pastel pigment may be sufficient for adequate coloring whereas up to 10% by weight of a black pigment may be necessary.

A particularly suitable mixture of polymers for use in the uniform application of the pigment in finely dispersed form to the fibres is a mixture of a polyamide epichlorhydrin resin and an etherified methylol melamine resin.

In a preferred aspect of the present invention, the pigments are applied to the fibres from an aqueous solution or emulsion of a suitable polymer or mixture of polymers containing a small amount of wetting agent. Suitable solutions or emulsions may contain up to about 4% by weight of the polymer or mixture of polymers and up to about 0.5% by weight of the wetting agent. Preferably the wetting agent is of the non-ionic type such as a nonylphenyl polyoxy-ethylene condensation product or a nonylphenyl polyglycol ether. In this aspect the pigment may be applied to the fibres in a dispersion comprising an aqueous liquor containing the pigment dyestuff a nonionic wetting agent, between 0.1 and 2% by weight of a polyamide epichlorhydrin resin and between 0.1 and 2% by weight of an etherified methylol melamine resin.

When the pigment is applied from an aqueous solution or emulsion to the fibres in the form of fabric, the solution or emulsion may be applied so as to leave an amount of from 50 to 80% on the weight of the fibres. On the other hand, when the fibres are in the form of sliver or top, the solution or emulsion may be applied so as to leave from 100 to 130% on the weight of the fibres.

In order to assist the even application of the pigment dispersion onto the fibres, it is preferred that the wool or other keratinous material be chlorinated, for example, by a gaseous or conventional aqueous chlorination procedure, before treatment with the pigment dispersion.

The dispersion may be suitably applied to the material by means of conventional padding equipment in which the material to be dyed is passed through the liquor, the excess liquor being squeezed out by a pair of rollers thereby leaving an even distribution of liquor on the material.

As described above, after the pigment dispersion is applied to the material, the material is dried so as to fix the dispersion onto the individual fibres of the material. Suitable drying methods include heat and steam curing. This drying forms a weakly bonded coating uniformly spread over the surface of each fibre of the material.

After the material is dried, another polymer, selected so as not to modify the handle of the material adversely, is spread over the pigmented layer on each fibre so as to protect or retain this layer. The selection of the polymers used in the process of the present invention is of some importance since the surface energies of the wool and subsequent layers of polymers must be correct to obtain even layers of pigment and resins on the fibres. Acrylic polymers, and especially soft acrylic polymers, have been found very suitable for use in forming an even protective layer of resin over the pigment layer, particularly when the pigment has been applied with the polyamide epichlorhydrin resin/etherified methylol melamine resin mixture described above. The present invention is not, however, restricted to the use of such polymers in this stage.

The protective polymer layer is preferably applied from solution or emulsion using the conventional padding equipment described briefly above. Thus the solution or emulsion may be applied to the fibres so as to leave up to 130% of the solution or emulsion on the weight of the fibres. It may also be necessary to include a catalyst such as ammonium chloride in the solution or emulsion. Suitably, when an acrylic polymer is to be applied as the protective polymer, it is applied in the form of an aqueous emulsion containing from 0.5 to 7% of the polymer and containing about 0.5% of ammonium chloride as catalyst.

It has been found that the application of this protective layer of polymer improves the fastness of the pigment dyed material to washing and "crocking."

The final steps in this process consist of drying and curing of the coated material. These steps may be carried out in any suitable manner known to those skilled in the art.

The following examples illustrate this invention but are not to be construed as limiting the invention in any way:

EXAMPLE 1

A white wool worsted fabric was chlorinated by a conventional aqueous chlorination procedure and dried. The fabric was open width padded with an aqueous solution containing 0.5% of non-ionic wetting agent (nonylphenyl poloxy-ethylene condensation product), 0.2% of a polyamide epichlorhydrin resin, 0.2% of an etherified methylol melamine and 1% of C.I. Pigment Blue 15, the squeeze rollers being adjusted to leave 60% of the solution on the weight of wool. The fabric was run from the padding mangle directly into an open width fabric forced air flow drier at 150° C. for 2 minutes. The dried fabric was then padded in open width with an aqueous emulsion containing 4% of a soft polyacrylate resin and 0.5% of ammonium chloride, the squeeze rollers being adjusted to leave 60% of the emulsion on the weight of wool. The fabric was dried in an open width forced air drier and then cured at 150° C. for 2 minutes.

EXAMPLE 2

A white wool worsted fabric was chlorinated by a conventional aqueous chlorination procedure and dried. The fabric was padded in open width with an aqueous solution containing 0.5% of a nonylphenol polyglycol ether, 0.5% of a polyamide epichlorhydrin resin, 0.2% of an etherified methylol melamine and 1% of C.I. Pigment Red 112 (as a fine paste), the squeeze rollers being adjusted to leave 60% of the solution on the weight of wool. The fabric was run from the padding mangle directly into an open width forced air flow drier at 140° C. for 2 minutes. The dried fabric was open width padded with an aqueous emulsion containing 6.5% of a soft polyacrylate resin and 0.5% of ammonium chloride, the squeeze rollers being adjusted to leave 60% of the emulsion on the weight of wool. The fabric was dried in an open width forced air flow drier and then cured at 140° C. for 2.5 minutes.

EXAMPLE 3

A white wool woollen fabric was treated in the same way as the fabric in Example 1.

EXAMPLE 4

A white wool knitted fabric was treated in similar manner to the fabric in Example 1 but only 0.2% of C.I. Pigment Blue 15 was used.

EXAMPLE 5

A white wool woollen fabric was treated in a similar manner to the fabric in Example 1 but 0.5% of C.I. Pigment Yellow 3 was used in place of C.I. Pigment Blue 15.

EXAMPLE 6

A sample of white chlorinated wool sliver was padded with an aqueous solution containing 0.5% of non-ionic wetting agent (nonylphenyl poly oxy-ethylene condensatio product), of 0.2% of a polyamide epichlorhydrin resin, 0.2% of an etherified methylol melamine and 1% of C.I. Pigment Blue 15, the squeeze rollers being adjusted to leave 120% of the solution on the weight of wool.

The fabric was run through a steaming chamber for 2 minutes at 100° C. before drying in a conventional sliver drier. The dried sliver was then padded with an aqueous emulsion containing 2% of a soft polyacrylate resin and 0.5% of ammonium chloride, the squeeze rollers being adjusted to leave 120% on the weight of the wool.

The wool was steamed again for 2 minutes before drying in a conventional sliver drier.

Samples from each of the above fabrics were all exposed to light in a Zerotest 150. The light fastness ratings (I.S.O. Tentative Test-Standard Methods for the Determination of Colour Fastness of Textiles, 3rd edition, Bradford S.D.C. p. 53 (1962)) were 7–8 compared with 4–5 for the best rating for similar shades by conventional dyeing methods.

Samples from each of the above fabrics were also subjected to a standard washing test (I.S.O.3.–Standard Methods for the Determination of Colour Fastness of Textiles, 3rd edition, Bradford S.D.C. p. 106 (1962)). The change of shade ratings were 5 compared with 4 for the best obtained for similar shades by conventional dyeing. There was no staining of samples of wool, cotton or synthetic fibrous materials washed together with the pigment colored fabrics.

It will be appreciated that many modifications may be made to the particular process described above without departing from the concept of this invention. The present invention is to be understood as including all such modifications falling within its spirit and scope.

We claim:

1. A process for the coloring of textile materials consisting wholly or partly of wool or other keratinous fibers which comprises coating the fibers with a dispersion of a finely divided solid pigment in an aqueous liquor containing up to 4% by weight of a mixture of a polyamide-epichlorhydrin resin and an etherified methylol melamine resin, drying the applied dispersion on the fibers, treating the thus coated fibers with an aqueous emulsion of a soft acrylic polymer containing from 0.5 to 7% of the polymer and drying and curing the treated fibers.

2. A process as claimed in claim 1, wherein the aqueous liquor contains from 0.1 to 2% by weight of each of the polyamide-epichlorhydrin and etherified methylol melamine resins.

3. A process as claimed in claim 1, wherein the aqueous liquor is applied to a fabric containing the fibers so as to leave from 50 to 80% by weight of the liquor on the fibers.

4. A process as claimed in claim 1, wherein the aqueous liquor is applied to a sliver or top containing the fibers so as to leave from 100 to 130% by weight of the liquor on the fibers.

5. A process as claimed in claim 1 wherein the aqueous liquor is applied by padding.

6. A process as claimed in claim 1, wherein the emulsion of the soft acrylic polymer is applied so as to leave up to 130% by weight of the emulsion on the fibers.

7. A process as claimed in claim 1, wherein the emulsion of the soft acrylic polymer contains about 0.5% of ammonium chloride as catalyst.

8. A process as claimed in claim 7, wherein the emulsion is applied by padding.

9. A process as claimed in claim 1, wherein the fibers are chlorinated before the first coating step.

References Cited
UNITED STATES PATENTS

| | | | |
|---|---|---|---|
| 3,390,010 | 6/1968 | Frerker et al. | 117—141 X |
| 3,322,562 | 5/1967 | Kumins et al. | 117—767 X |
| 2,431,562 | 11/1947 | Jacoby | 8—128 A |
| 3,019,076 | 1/1962 | Pardo et al. | 117—141 X |
| 3,076,690 | 2/1963 | Hayashi | 8—128 R |
| 2,883,304 | 4/1959 | Kine et al. | 117—141 X |
| 3,108,897 | 10/1963 | Hamiter et al. | 117—141 X |
| 2,719,104 | 9/1955 | Westberg | 8—128 R X |
| 3,476,580 | 11/1969 | Jinnette | 117—76 T X |

RALPH HUSACK, Primary Examiner

U.S. Cl. X.R.

8—128 A; 117—76 T, 141